United States Patent
Srivastava et al.

(10) Patent No.: US 10,783,068 B2
(45) Date of Patent: Sep. 22, 2020

(54) GENERATING REPRESENTATIVE UNSTRUCTURED DATA TO TEST ARTIFICIAL INTELLIGENCE SERVICES FOR BIAS

(71) Applicant: International Business Machines Corporation, Armonk, NY (US)

(72) Inventors: Biplav Srivastava, Yorktown Heights, NY (US); Francesca Rossi, Yorktown Heights, NY (US); Aleksandra Mojsilovic, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 16/157,307

(22) Filed: Oct. 11, 2018

(65) Prior Publication Data
US 2020/0117582 A1 Apr. 16, 2020

(51) Int. Cl.
*G06F 11/36* (2006.01)
*G06N 5/04* (2006.01)

(52) U.S. Cl.
CPC ...... *G06F 11/3688* (2013.01); *G06F 11/3664* (2013.01); *G06F 11/3684* (2013.01); *G06N 5/045* (2013.01)

(58) Field of Classification Search
CPC ... G06F 11/36; G06F 11/3664; G06F 11/3684
USPC ....................................................... 714/38.1
See application file for complete search history.

(56) References Cited

U.S. PATENT DOCUMENTS

| | | | |
|---|---|---|---|
| 8,938,463 B1 * | 1/2015 | Kim | G06F 16/9535 707/751 |
| 9,367,435 B2 | 6/2016 | Sinyagin et al. | |
| 9,436,725 B1 * | 9/2016 | Aithal | G06F 16/24 |
| 9,606,980 B2 | 3/2017 | Andrejko et al. | |
| 2014/0304200 A1 * | 10/2014 | Wall | G16H 40/67 706/12 |
| 2015/0178639 A1 | 6/2015 | Martin et al. | |
| 2016/0170972 A1 * | 6/2016 | Andrejko | G06F 40/56 704/9 |
| 2016/0283197 A1 * | 9/2016 | Wilber | G06F 7/58 |
| 2018/0144243 A1 * | 5/2018 | Hsieh | G06N 3/0454 |
| 2019/0114543 A1 * | 4/2019 | Chen | G06N 3/08 |
| 2019/0147371 A1 * | 5/2019 | Deo | G06N 20/00 706/12 |

(Continued)

OTHER PUBLICATIONS

Jonathan Baxter, A Model of Inductive Bias Learning, Nov. 1999, Journal of Artificial Intelligence Research 12 (2000) 149-198 (Year: 1999).*

(Continued)

*Primary Examiner* — Kamini B Patel
(74) *Attorney, Agent, or Firm* — Anthony Curro, Esq.; McGinn IP Law Group, PLLC (57) ABSTRACT

A bias detection method, system, and computer program product to evaluate bias in an artificial intelligence service include selecting a bias context, the bias context having a bias specification associated with the bias context, generating test data for determining the bias in the artificial intelligence service based on the bias specification and the bias context, and testing the artificial intelligence service for the bias with the generated test data.

20 Claims, 5 Drawing Sheets

(56) References Cited

U.S. PATENT DOCUMENTS

2019/0172081 A1* 6/2019 Baron ............... G06Q 30/0204
2019/0349333 A1* 11/2019 Pickover .................. G06N 3/02
2019/0354805 A1* 11/2019 Hind .................... G06K 9/6269
2019/0362396 A1* 11/2019 Srivastava ............. G06F 40/30
2020/0005168 A1* 1/2020 Bhargava ............. G06K 9/6215
2020/0143225 A1* 5/2020 Lafontaine ............. H04W 8/18

OTHER PUBLICATIONS

Mel, et al. "The NIST Definition of Cloud Computing". Recommendations of the National Institute of Standards and Technology. Nov. 16, 2015.

* cited by examiner

GENERATING REPRESENTATIVE UNSTRUCTURED DATA TO TEST ARTIFICIAL INTELLIGENCE SERVICES FOR BIAS

BACKGROUND

The present invention relates generally to a bias detection method, and more particularly, but not by way of limitation, to a system, method, and computer program product to generate test data based on a user's (or developer's) requirement for what bias to test, for what protected variable(s), and in which context (decision-making scenario).

Bias is a major concern in the adoption of artificial intelligence (AI) services, whether they are built by learning on training data or encoding manually provided inputs (rules). Generating representative unstructured data for the purpose of testing and rating AI services is a major practical concern.

Conventional techniques generate test data for Natural Language Processing (NLP) services by parsing sentences and creating variations. However, the conventional techniques do not consider data generation to test for bias in AI services because the conventional techniques have no notion of protected variables and their values, and the context for bias.

Therefore, a new technique is needed to consider protected variables and their values for bias, context for bias and to generate test data to test for bias in a new AI services using protected variables and contexts.

SUMMARY

In an exemplary embodiment, the present invention provides a method to evaluate bias in an artificial intelligence service that includes selecting a bias context, the bias context having a bias specification associated with the bias context, generating test data for determining the bias in the artificial intelligence service based on the bias specification and the bias context, and testing the artificial intelligence service for the bias with the generated test data. One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
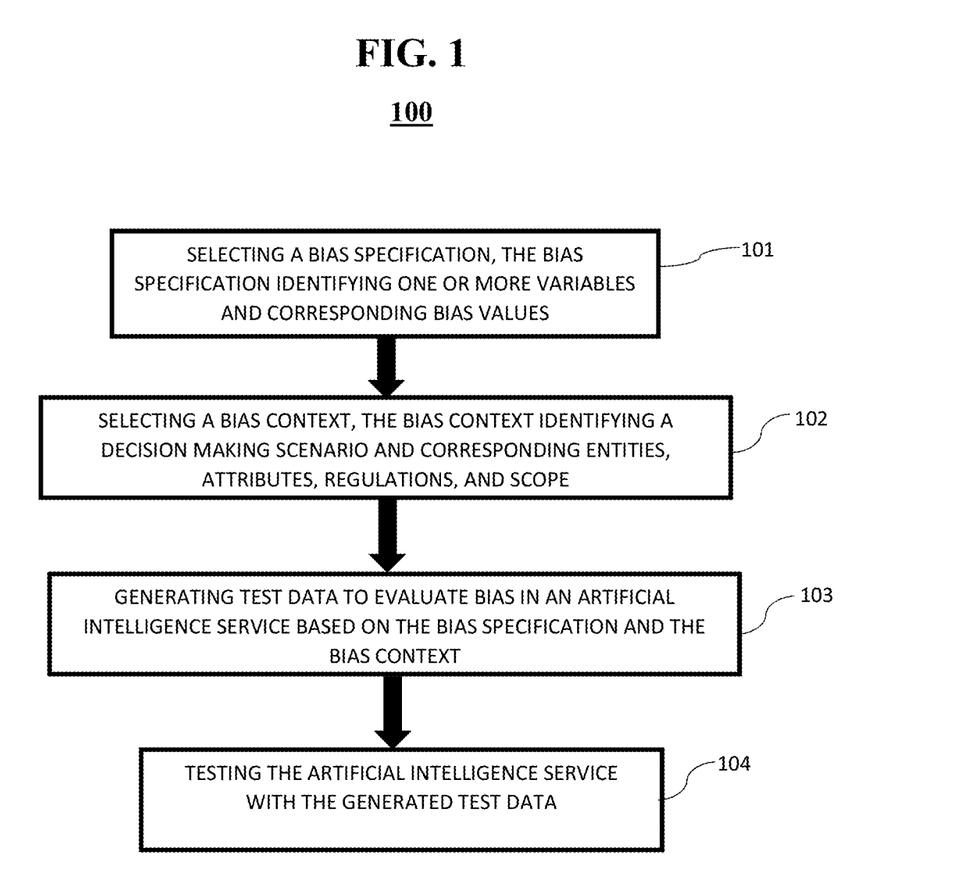
FIG. 1 exemplarily shows a high-level flow chart for a bias detection method 100 according to an embodiment of the present invention.

By way of introduction of the example depicted in FIG. 1, an embodiment of a bias detection method 100 according to the present invention can include various steps for using bias specification and context to generate bias test data.

Thus, the invention can generate representative unstructured data to test AI services for bias.

It is noted that bias in the context of the invention means error within the artificial intelligence service that is not based on computing error and is not balanced (e.g., translating text with 90 percent male pronouns to a text with 50 percent male and female pronouns may be considered bias). As such, bias may be considered a deviation from what one believes in a specific context.

Figure 3:
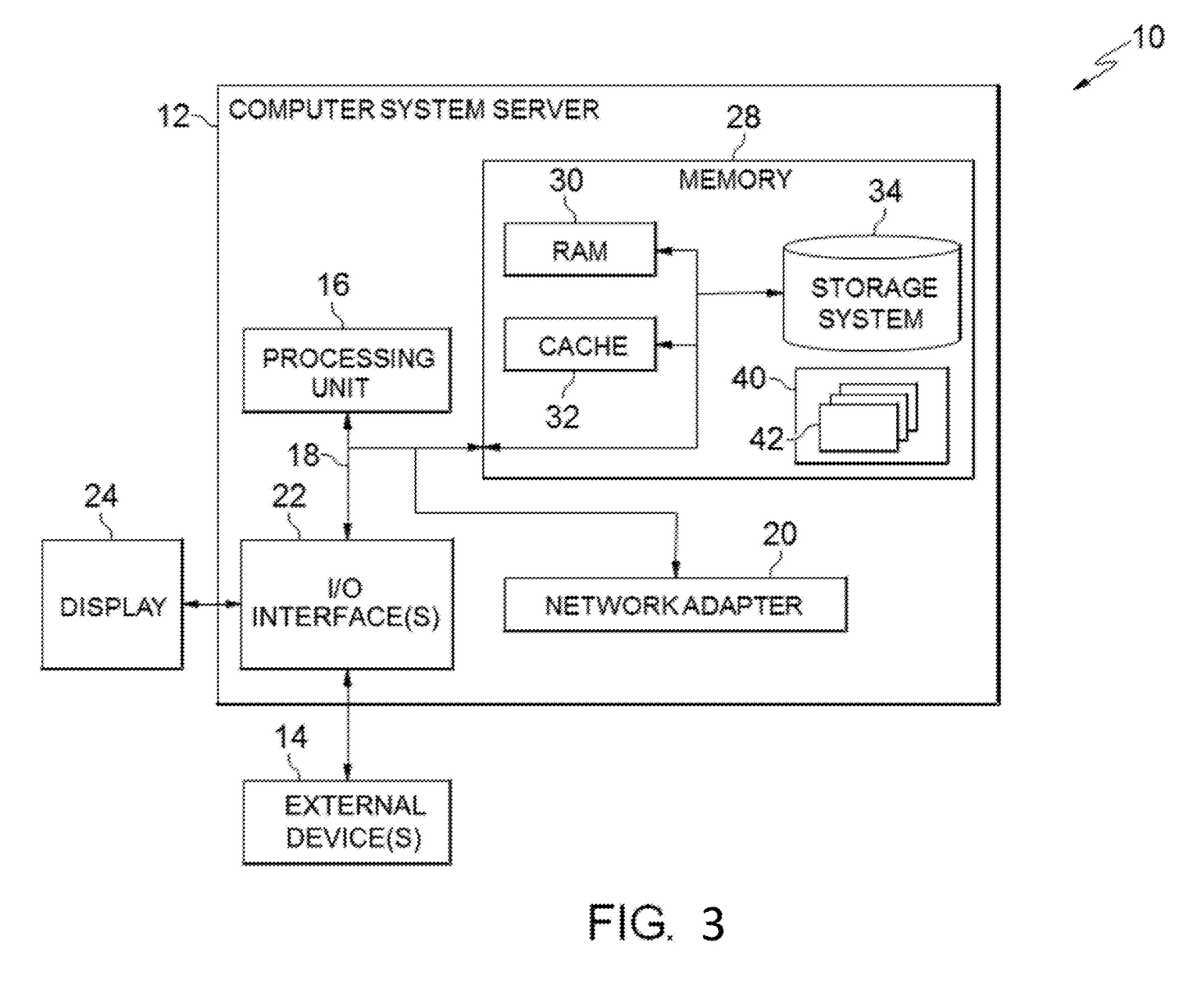
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 5), it is nonetheless understood that the present invention can be implemented outside of the cloud environment.

Figure 2:
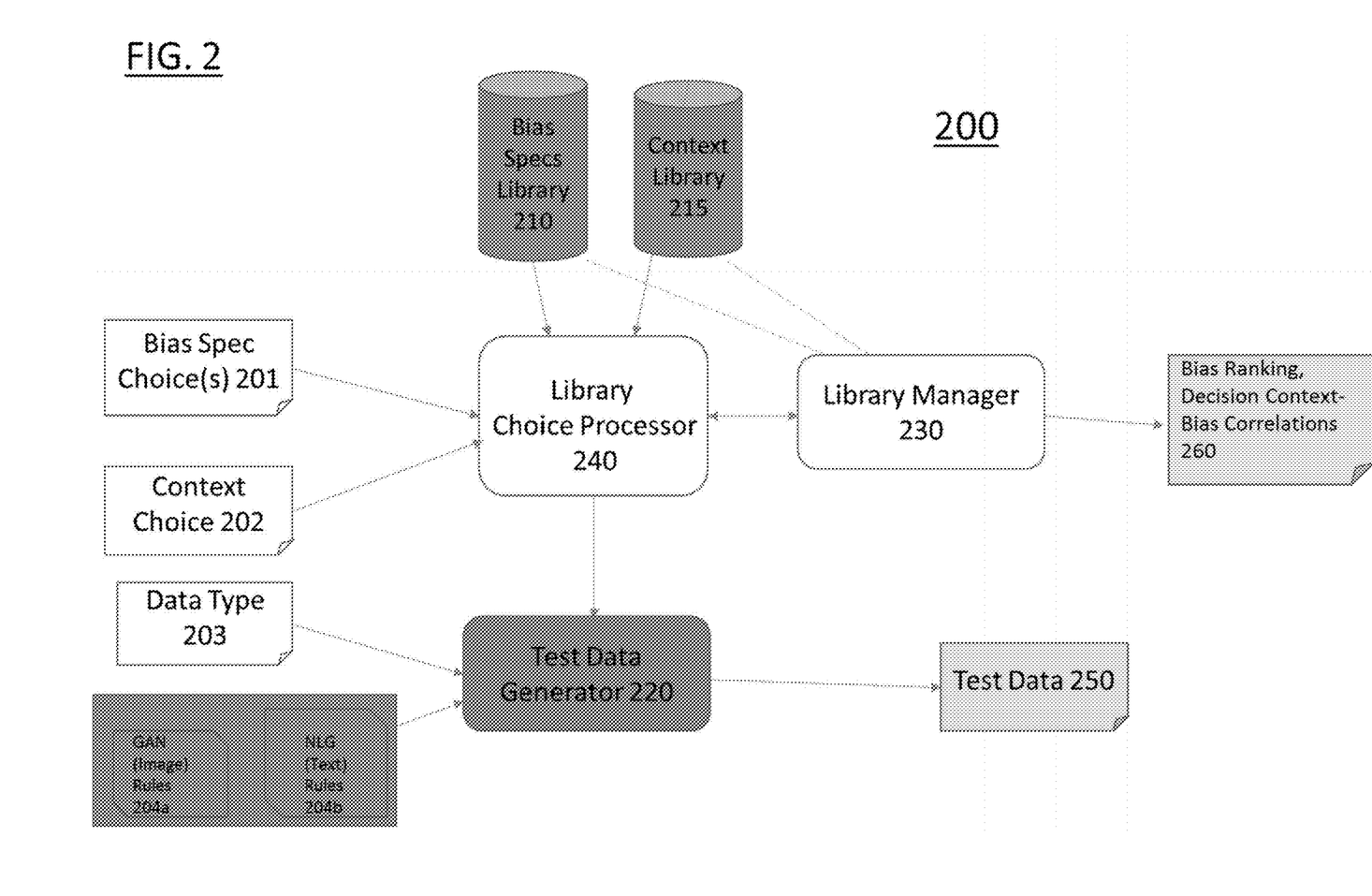
FIG. 2 exemplarily depicts a system architecture 200 according to an embodiment of the present invention.

Referring to FIGS. 1 and 2, the method 100 and system architecture 200 facilitate the generation of test data for evaluating bias in an artificial intelligence service(s). That is, a context for testing for bias is selected and various bias specification points are used within the context to generate test data for testing an AI service for bias within the service.

More specifically, referring to FIG. 1, in step 101, a bias specification is selected. The bias specification identifies one or more variables and corresponding bias values.

In one embodiment, a universal (general) category of biases is supported that includes race, age, religion, gender, etc. In another embodiment, the bias specification consists of a general category and a region-specific category, with the region-specific category having precedence over general category when applicable.

A bias specification example can include, "Variable Name: Gender"; "Values: He, She, Other"; "Unbiased: He: 0.5; She: 0.5; Other: 0"; "Biased: B1: He: 0.9; She: 0.1; Other: 0". That is, the bias specification can include a hierarchical specification that can be based on a general domain (e.g., male/female) or a specific region (e.g., male/female/other). And, the bias specification is used to generate test data for a given context to find if the AI service generates an unbiased output (e.g., uses "he" 50% of the time and uses "she" 50% of the time) or if the output is bias by changing the original input. For example, if the original input in a translation AI service includes 100% male pronouns, the specification would test to make sure that the output includes 100% male pronouns so that bias is not introduced by the AI service.

In step 102, a bias context is selected. The bias context identifies a decision-making scenario and corresponding entities, attributes, regulations, and scope. That is, the bias context can include a domain specific context (e.g., where context is a "business decision-making scenario"), can include a human resource element (e.g., hiring specific), a banking element (e.g., loan specific), a health element (e.g., hospitalization specific), etc. to determine if there is bias in the specific domain as bias changes based on the domain and context. In one embodiment, each context has a "template" set of bias specifications associated with the context. For example, if the AI service is for hiring under U.S. law, the bias specification can include data points to test if the hiring AI service satisfies U.S. employment discrimination laws.

In one embodiment, the context (e.g., decision-making scenario) representation can be in a human resource context. The context can include entities (e.g., candidate, employer, hiring manager, jobs, resume, etc.), attributes (e.g., decision, name, age, race, gender, last-salary, religion, experience, education, nationality, etc.), protected attributes (e.g., race, age, religion, gender, etc.), protected conditions that a checker may use to verify behavior (i.e., constraints involving protected attributes), regulations (e.g., equal opportunity employment (US), etc.), application scope (e.g., a region as United States and Time as 1960+). In other words, the bias context scopes what type of data would normally be input into the AI service such that test data can be generated for testing the AI service.

It is noted that the bias context can change the bias specification. Different bias specification values can be used for different bias context situations. In other words, the bias context and the bias specification can be dependent on each other and the specification values are dictated based on the context. For example, different bias specification values can be used in an employment context versus a political context. In one embodiment, a user can modify the bias specification values for their desired bias/unbiased test data. As such, the user may affirmatively generate bias or can test for bias and then change a desired value (e.g., 50-50).

In step 103, test data for evaluating bias in an artificial intelligence service(s) is generated based on the bias specification and the bias context. That is, using the biased specification and bias context, generation rules are selected. The attributes and distributions thresholds from context are resolved. The attributes and values from specifications of bias(es) are resolved. And, based on these parameters, the test data is generated as solution agnostic to specific data generation template (e.g., a template suitable for input to test the AI service). For example, in a hiring context, a resume for fifteen different applicants having traits of the bias specification can be generated for the AI service to select which to hire. Or, in a banking context, bank loan applications for fifteen different applicants can be generated such that each bank loan application represents different bias specification data to test if the AI service is bias.

In step 104, the AI service is tested with the generated test data.

For example, an AI service for hiring for a company can be tested with generated test data. In such an embodiment, the bias context can be selected as "hiring context". Bias specification templates can be associated with the bias context of hiring. Or, a user can modify the templates and specifically test the AI service for bias based on gender and race, for example. Using the bias context and bias template, the test data is generated by selecting generation rules such as generating data in the form of a job posting template or a resume template. Attributes and frequency distributions are then resolved by looking up such as in the context specification of hiring, a gender threshold (e.g., 50/50 for male/female) and a race threshold (e.g., equal to population percentages). Attributes and values for the context are looked up via the bias specification to fill-in the data for the template (e.g., gender=M/F; Race=X, Y, Z). Based on this, the test data is generated by Natural Language Generation (NLG) methods, for example, using the open-source simpleNLG tool and document template to generate test data (e.g., job descriptions). Then, the job templates are processed through the AI to test which applicants are selected and if there is bias in the selection.

It is noted that the bias specification is hierarchical and extendable. Also, ranking of biases can be learnt over time from user selections. For example, data about users can be used to validate the bias specification selected to generate the data. And, a correlation can be learnt over time from user selections as well as a correlation between bias specs and context is learnt from user selections over time.

Referring generally to FIG. 2, the system architecture 200 can facilitate the method 100. For example, details of selected bias(es) can be retrieved from the Bias Spec Library (BSL) 210 and details of selected context can be retrieved from the Context Library (CL) 215 based on the bias specification choice(s) 201 and context choices 202. In other words, the user can set up parameters for the bias to be tested by selecting the bias specification choices 201 and context choices 202, which are then retrieved by the library choice processor 240 from the libraries 210 and 215. The bias specification and context can now be plugged into any data generation framework to generate data. For data type (203) of text, using the Natural Language Generation (NLG) rules 204b along with document templates associated with context 202 (e.g., a resume, job description for hiring) and bias variables 201, the test data generator 220 resolves attributes and distributions thresholds.

Similarly, for data type (2013) of image, the test data generator 220 uses method of Generative Adversarial Network (GAN) 204a [https://skymind.ai/wiki/generative-adversarial-network-gan]. It resolves attributes and distributions thresholds from context and resolves attributes and values from specifications of bias(es). The GAN method relies on a pre-known dataset of images that serves as the initial training data for the discriminator. The context-based 202 bias variables and values 201 help select the initial images to bootstrap learning.

The library manager 230 is updated with information about resolved contexts, bias variables and values used; and the test data 250 is generated. Using the history of data collected, the library manager can calculate the most common biases tested, as well as the correlation between the contexts and biases used. The library manager generates the bias rankings, and the decision context-bias correlations 260.

Thereby, test data can be generated to test AI for bias for different data types. The bias specification and bias context can be changed to generate test data that predicts the bias in the AI services. And, the AI service can be tested to determine if the result of using the AI is a bias or unbiased output.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
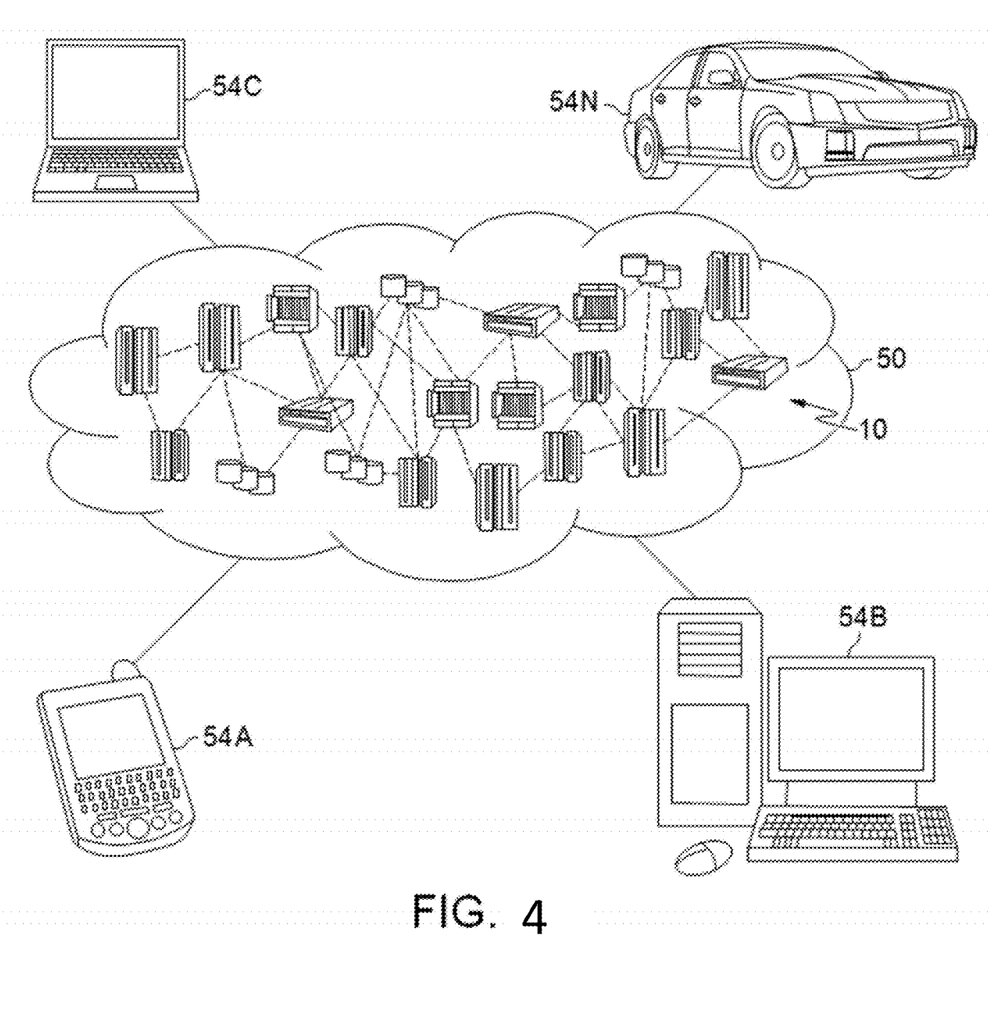
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
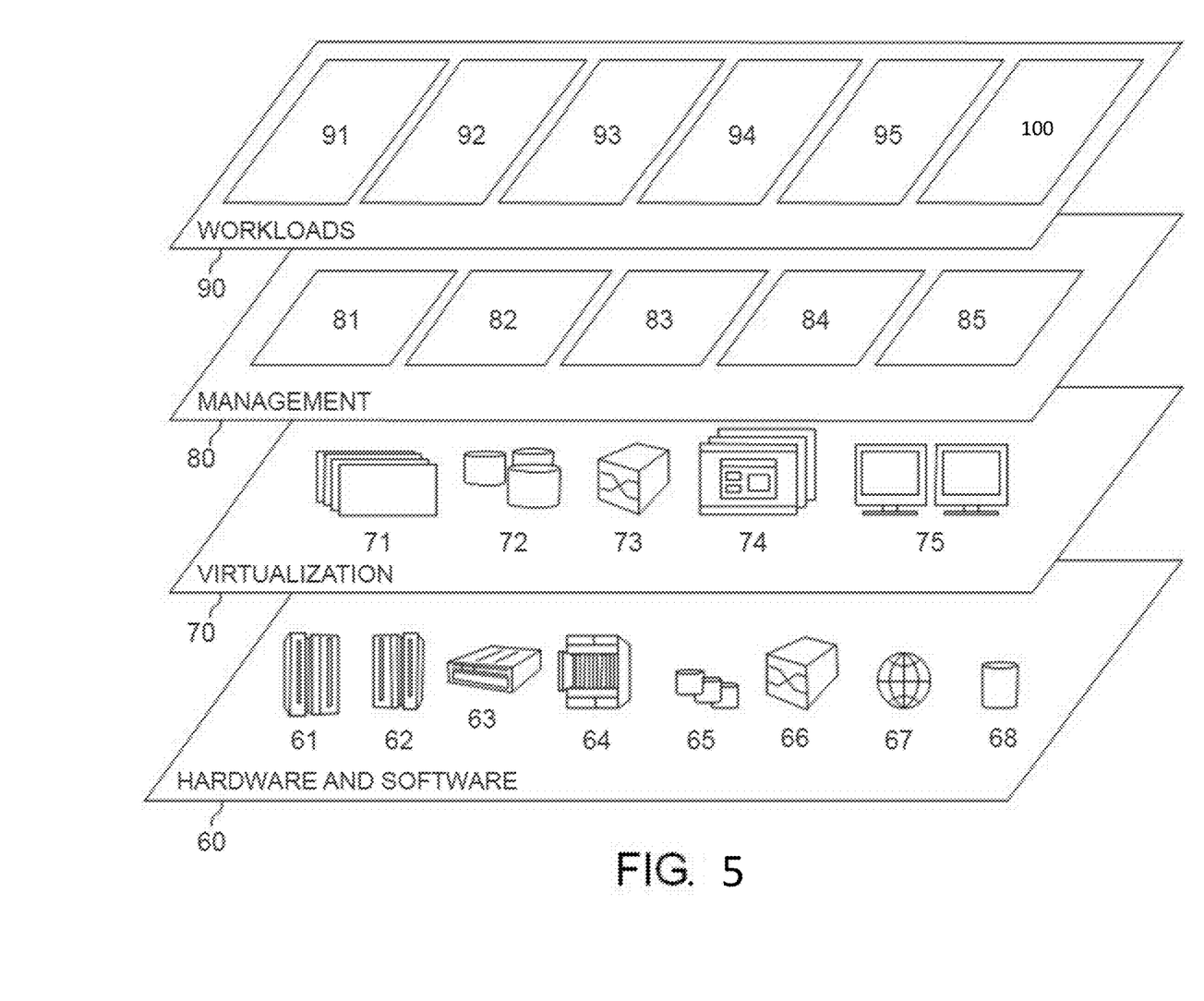
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bias detection method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented bias detection method to evaluate bias in an artificial intelligence service, the method comprising:
   selecting a bias context, the bias context having a bias specification associated with the bias context;
   generating test data for determining the bias in the artificial intelligence service based on the bias specification and the bias context; and
   testing the artificial intelligence service for the bias with the generated test data.

2. The computer-implemented method of claim 1, wherein the bias specification is modified for a specific type of bias.

3. The computer-implemented method of claim 1, wherein the bias specification identifies one or more variables and corresponding bias values.

4. The computer-implemented method of claim 1, wherein the bias context identifies a decision-making scenario and corresponding entities, attributes, regulations, and scope.

5. The computer-implemented method of claim 1, further comprising learning a correlation between the bias specification and the bias context from the generated test data.

6. The computer-implemented method of claim 1, wherein the bias specification is hierarchical and extendable.

7. The computer-implemented method of claim 1, embodied in a cloud-computing environment.

8. A computer program product for bias detection to evaluate bias in an artificial intelligence service, the computer program product comprising a computer-readable storage medium having program instructions embodied therewith, the program instructions executable by a computer to cause the computer to perform:
   selecting a bias context, the bias context having a bias specification associated with the bias context;
   generating test data for determining the bias in the artificial intelligence service based on the bias specification and the bias context; and
   testing the artificial intelligence service for the bias with the generated test data.

9. The computer program product of claim 8, wherein the bias specification is modified for a specific type of bias.

10. The computer program product of claim 8, wherein the bias specification identifies one or more variables and corresponding bias values.

11. The computer program product of claim 8, wherein the bias context identifies a decision-making scenario and corresponding entities, attributes, regulations, and scope.

12. The computer program product of claim 8, further comprising learning a correlation between the bias specification and the bias context from the generated test data.

13. The computer program product of claim 8, wherein the bias specification is hierarchical and extendable.

14. A bias detection system to evaluate bias in an artificial intelligence service, the system comprising:
   a processor, and
   a memory, the memory storing instructions to cause the processor to perform:
      selecting a bias context, the bias context having a bias specification associated with the bias context;
      generating test data for determining the bias in the artificial intelligence service based on the bias specification and the bias context; and
      testing the artificial intelligence service for the bias with the generated test data.

15. The system of claim 14, wherein the bias specification is modified for a specific type of bias.

16. The system of claim 14, wherein the bias specification identifies one or more variables and corresponding bias values.

17. The system of claim 14, wherein the bias context identifies a decision-making scenario and corresponding entities, attributes, regulations, and scope.

18. The system of claim 14, further comprising learning a correlation between the bias specification and the bias context from the generated test data.

19. The system of claim 14, wherein the bias specification is hierarchical and extendable.

20. The system of claim 14, embodied in a cloud-computing environment.

* * * * *